Jan. 27, 1970  A. DE ANGELIS  3,491,371
VISOR ASSEMBLY FOR PROTECTIVE HEAD GEAR
Filed April 5, 1968  2 Sheets-Sheet 1

INVENTOR.
ARMAND DeANGELIS
BY
Kane, Dalsimer, Kane, Sullivan & Smith
ATTORNEYS

United States Patent Office 3,491,371
Patented Jan. 27, 1970

---

3,491,371
VISOR ASSEMBLY FOR PROTECTIVE HEAD GEAR
Armand DeAngelis, Southbridge, Mass., assignor to Univis, Inc., Fort Lauderdale, Fla., a corporation of Ohio
Filed Apr. 5, 1968, Ser. No. 719,082
Int. Cl. A42b 3/00
U.S. Cl. 2—6          11 Claims

ABSTRACT OF THE DISCLOSURE

A visor assembly for protective head gear has a means for moving a collection of visors individually from a stored position to an extended position in the normal field of vision of the user. The visors are arranged so as to permit independent, reliable movement especially in times of emergency. The means for moving the visors are conveniently located in the front of the assembly to permit the wearer to operate the visors with the use of one hand.

BACKGROUND OF THE INVENTION

This invention relates to a visor assembly for use on pilot's protective head gear, crash helmets and the like.

Many uses for protective head gear require more than one visor or lens. For example, military personnel operating high-speed aircraft frequently have use for a clear plastic lens or visor located on the front of the helmet to act as a shield against wind, dust particles in the air, or other physical elements which tend to interfere with vision or other activity. In addition, there is also frequently need for a lens or visor which is tinted to reduce glare and otherwise improve eye comfort of the user.

Several suggestions have been made for providing a protective head gear upon which are mounted dual visors. One such assembly is designed to be attached to the outside of the helmet or head gear and has means for sliding the visors into the line of vision. The means for moving the visors into or out of the field of vision are mounted on the helmet in a tandem fashion so that one lens or visor may be moved up and down vertically by a knob disposed just above the line of vision while the knob for sliding the other lens or visor is mounted substantially in line with the first knob but to the extreme rear of the head gear.

By placing the actuator knobs in a tandem fashion, i.e. by locating one knob in the front part of the helmet and the other knob to the extreme rear along the same center line, it becomes difficult, if not impossible, for the user to operate both visors with the same hand in one operation. In addition, it is fequently awkward for the user of the head gear to have to reach almost completely to the rear of the helmet to slide one of the visors into the line of vision. When an emergency arises it is frequently necessary for the user to be able to conveniently and easily move either or both visors into or out of the line of vision using only one hand while the other hand is occupied. In addition, such a tandem arrangement leaves the track along which the rearwardly positioned knob moves uncovered and exposed to dust, grease, and moisture, etc. thus increasing the chances of jamming or other malfunction in time of emergency. Other attempts to arrange a dual visor assembly have resulted in a tendency of the visors to jam and lock if moved too rapidly.

Although many attempts were made to overcome the foregoing and other difficulties, none, as far as I am aware, was entirely successful when carried into practice commercially on an industrial scale.

BRIEF SUMMARY

I have now discovered an improved apparatus having several visors which can be applied to existing helmets and protective head gear and which functions reliably in emergencies. By the use of one hand requiring only an instant of the wearer's time, either or both visors may be moved into or out of the normal line of vision.

It is an object of this invention to provide an improved assembly for a pair of visors for use in conjunction with protective head gear including pilot's helmets, crash helmets, etc.

The invention also contemplates an improved apparatus which, when mounted on a protective head gear, can be manipulated by the operator using only one hand.

Another object of this invention includes an assembly of several visors arranged in such a way that they may rapidly and easily slide past one another into or out of the field of the user's vision.

Still another object of this invention is to provide a dual visor assembly which, when attached to a protective head gear, is essentially free from jamming and other malfunctions.

Other objects and advantages will become apparent from the following description taken in conjunction with the accompanying drawings in which.

DESCRIPTION OF THE INVENTION

In accordance with this invention, the visor assembly for a helmet includes a housing for coupling with the forward part of the helmet. A number of superimposed visors are slidably mounted on tracks attached to the helmet to allow independent movement of the visor between the superimposed stored position and an extended position in the normal field of vision of the wearer of the helmet. Finger-operated means located adjacent one another and externally of the housing connect to the visors to permit the visors to be releasably secured between the stored and extended positions. Also provided is a connecting means through which at least one visor is attached to the finger-operated means to permit a superimposed relationship among the visors and to prevent the attached visor from interfering with the independent movement of the other visors. The connecting member has upper and lower legs with sufficient clearance between the legs to permit the member to straddle at least one visor in the stored position. This assembly permits the visors to be moved into and out of the normal field of vision by simply using one hand of the wearer of the helmet.

In carrying the invention into practice, the visor assembly can comprise a housing covering the assembly for coupling with the forward part of a helmet; a pair of track means for determining the path of travel of a pair of visors, said track means being adaptable for mounting on the sides of a helmet; first and second visors slidably mounted on the track means for independent movement between a stored position and a position in the normal field of vision of the user of the head gear; a connecting member attached to the first visor, said member having upper and lower legs with sufficient clearance between the legs to permit the member to straddle the second visor when it is out of the normal field of vision in the stored position; a pair of finger operated means, one of which is attached to the connecting member and the other to the second visor, to permit the visors to be releaseably secured between each of the aforesaid positions, said finger operated means located externally of the housing and adjacent one another in the front portion of the assembly, whereby the visors may be moved into and out of the normal field of vision by simply using one hand of the wearer.

Figure 1:
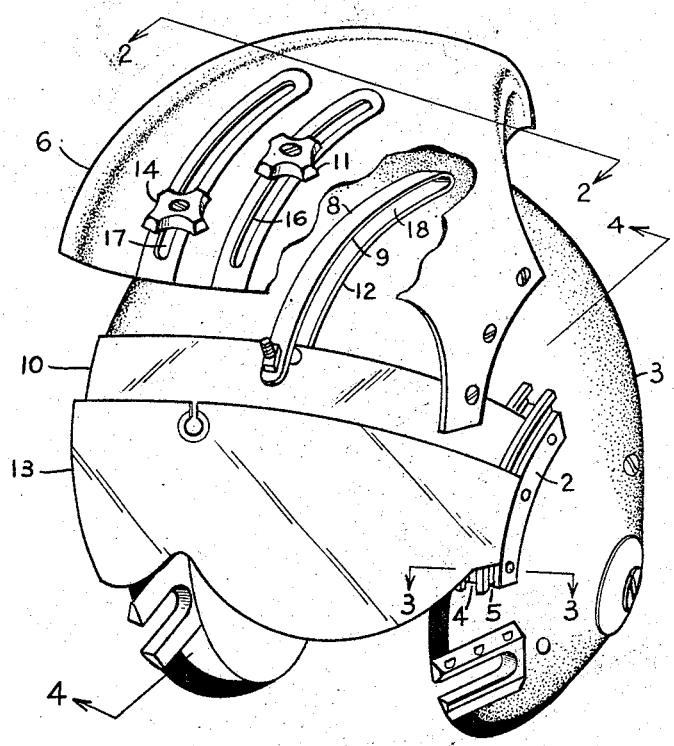
FIGURE 1 is an exploded perspective view of a dual visor assembly and helmet.
Figure 3:
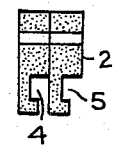
FIGURE 3 is a horizontal sectional view of the track means taken along the line 3—3.

Referring now to the drawings, FIGURE 1 shows track means 2 conveniently mounted with screws on each side of the helmet 3. The track means consist of an inner track 4 and outer track 5 as can be seen from FIGURE 3. When the housing 6 is mounted in position, it forms a guidewall for the outer tracks.

Figure 4:
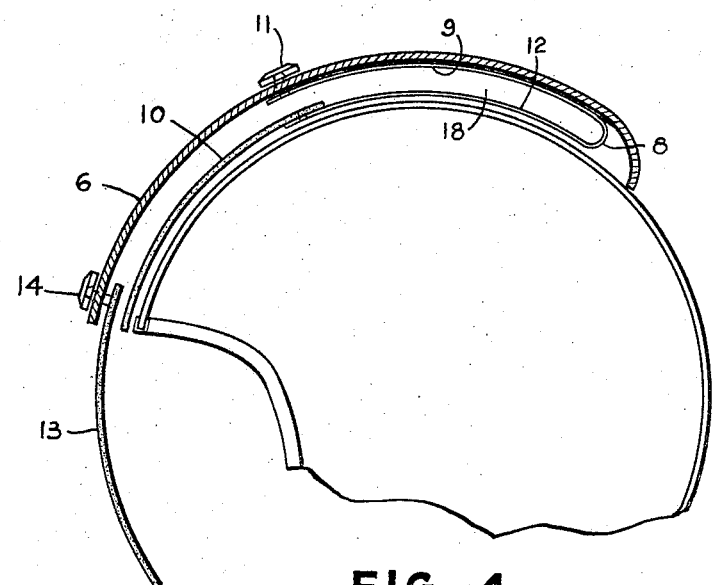
FIGURE 4 is a vertical section of the visor assembly and helmet taken along the line 4—4 showing one arrangement of the visors.
Figure 5:
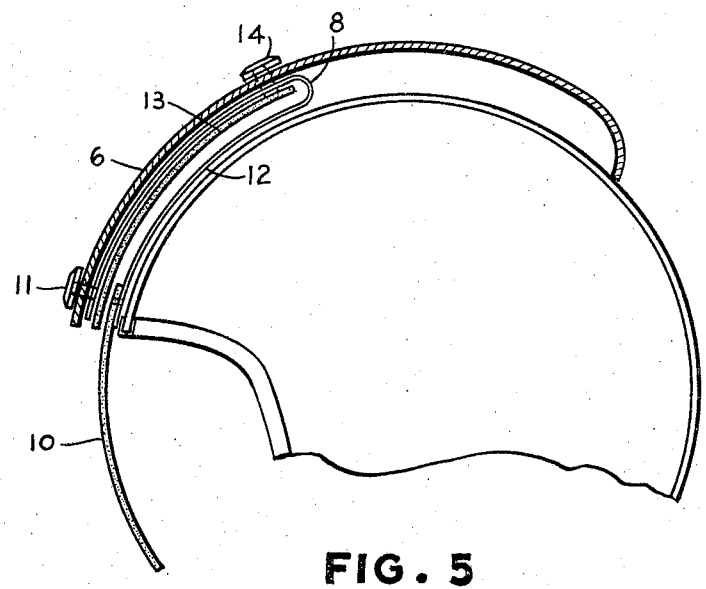
FIGURE 5 is a vertical section of the visor assembly and helmet taken along the line 4—4 showing another arrangement of the visors.

Connecting means or members 8 has an upper leg 9 and a lower leg 12 and conveniently comprises a bent one-piece bar which conforms to the curve of the helmet. Visor 10 is connected to the forward end of lower leg 12 while a finger-operated means such as knob 11 is connected to the forward end of upper leg 9 and thus, by moving knob 11 up or down, visor 10 is moved out of or into the normal field of the wearers' vision. Also, FIGURE 5 shows the connecting member 8 straddling visor 13 in the stored position when visor 10 is in the field of vision. Visor 13 may be moved into and out of the normal field of vision of the user by finger-operated means 14 as shown in FIGURE 4. The clearance 18 between the upper leg 9 and lower leg 12 of connecting member 8 must be sufficient to permit visor 13 to move easily and be straddled by the legs when in the stored position without scratching or jamming.

Visors 10 and 13, conforming generally to the curvature of the front part of the helmet, are conveniently made of plastic, one of which can be clear and the other tinted.

Figure 2:
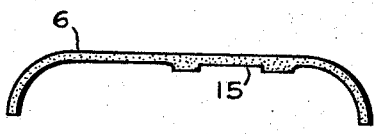
FIGURE 2 is a vertical section of the rearwardly extending part of the housing taken along the line 2—2.

Housing 6 which covers the assembly protects the connecting member 8, visors and other moving parts from dust, grease, and moisture thus insuring trouble-free operation especially in emergency situations. As shown in FIGURE 2, the housing is also provided with a channel 15 which extends along the rearward portion and is adapted to fit over the upper leg 9 of connecting member 8 and to act as a guide or passageway for the connecting member when visor 10 connected thereto is moved into or out of the field of vision. A pair of substantially parallel slots 16 and 17 are located near the middle of the front portion of the housing. Finger operated means 11 and 14 are provided in the slots of the housing for easy vertical motion. Means 14 connects to visor 13 directly while means 11 connects to the front part of the upper leg 9 of the connecting member 8 so that when means 11 is moved up or down, visor 10 will be moved out of or into the field of vision. Finger operated means 14 and 11 for releaseably securing the visors in the stored or line of vision position can be a knob and screw attached to the visor and upper leg of the connecting member respectively. In addition, means 14 and 11 may be tightened to maintain or lock the visors in position.

By properly positioning screw holes in the housing and the double tracks, the entire visor assembly can be mounted on present helmets. The visor can also be replaced in the field by simply removing the screws.

It should be noted that the unique construction of the visor assembly in accordance with this invention permits the means for moving the visor into and out of the field of normal vision of the wearer to be placed side by side in a parallel arrangement which facilitates easy manipulation by the user with only one hand without fear of jamming or otherwise encountering difficulties in using the assembly, especially during emergency.

Although the present invention has been described in conjunction with preferred embodiments, it is to be understood that modifications and variations may be resorted to without departing from the spirit and scope of the invention as those skilled in the art will readily understand.

What is claimed is:
1. A visor assembly for a helmet which comprises:
 a housing for coupling with the forward part of the helmet;
 track means mounted on the helmet;
 a plurality of superimposed visors slidably mounted in the track means for independent movement between the superimposed stored position and an extended position in the normal field of vision of the wearer of the helmet;
 a plurality of finger-operated means connecting with the visors to permit the visors to be releasably secured between the stored and extended positions, said finger-operated means located externally of the housing and adjacent one another; and
 connecting means through which at least one visor is attached to the finger-operated means to permit a superimposed relationship among the visors and to prevent the attached visor from interfering with the independent movement of the other visors, said connecting means comprising a member having upper and lower legs with sufficient clearance between the legs to permit the member to straddle at least one visor in the stored position, whereby the visors may be moved into and out of the normal field of vision by simply using one hand of the wearer of the helmet.

2. A visor assembly in accordance with claim 1 wherein the connecting means comprises a bent, one-piece bar.

3. A visor assembly in accordance with claim 2 mount on a helmet.

4. A visor assembly for a helmet which comprises:
 (a) a housing covering the assembly for coupling with the forward part of a helmet;
 (b) a pair of track means for determining the path of travel of a pair of visors, said track means being adaptable for mounting on the sides of a helmet;
 (c) first and second visors slidably mounted on the track means for independent movement between a stored position and a position in the normal field of vision of the wearer of the helmet;
 (d) a connecting member atached to the first visor, said member having upper and lower legs with sufficient clearance between the legs to permit the member to straggle the second visor when it is out of the normal field of vision in the stored position;
 (e) a pair of finger operated means, one of which is atached to the connecting member and the other to the second visor, to permit the visors to be releasably secured between each of the aforesaid positions, said finger operated means located externally of the housing and adjacent one another in the front portion of the assembly, whereby the visors may be moved into and out of the normal field of vision by simply using one hand of the wearer.

5. A visor assembly in accordance with claim 4 wherein the visor is attached to the forward end of the lower leg of the connecting member.

6. A visor assembly in accordance with claim 5 wherein the housing is provided with a rearwardly extending channel adapted to accommodate the connecting member.

7. A visor assembly in accordance with claim 6 wherein the housing is provided with a pair of substantially parallel vertically extending slots to accommodate the finger operated means.

8. A visor assembly in accordance with claim 7 wherein the finger operated means comprise a screw and adjustable knob for movement in the slotted housing.

9. A visor assembly in accordance with claim 8 wherein the connecting member is a bent, one-piece bar.

10. A visor assembly in accordance with claim 9 wherein one of the visors is clear and the other visor is tinted.

11. A visor assembly in accordance with claim 10 mounted on a helmet.

References Cited

UNITED STATES PATENTS 3,315,272  4/1967  Olt et al. _____ 2—6

JAMES R. BOLER, Primary Examiner.